(12) United States Patent
Kocher

(10) Patent No.: US 11,874,906 B1
(45) Date of Patent: Jan. 16, 2024

(54) SKIN PERSONAL IDENTIFICATION (SKIN-PIN)

(71) Applicant: Robert William Kocher, McLean, VA (US)

(72) Inventor: Robert William Kocher, McLean, VA (US)

( * ) Notice: Subject to any disclaimer, the term of this patent is extended or adjusted under 35 U.S.C. 154(b) by 67 days.

(21) Appl. No.: 16/743,641

(22) Filed: Jan. 15, 2020

(51) Int. Cl.
*G06F 21/32* (2013.01)
*G06V 40/10* (2022.01)
*G06V 40/13* (2022.01)

(52) U.S. Cl.
CPC ............ *G06F 21/32* (2013.01); *G06V 40/10* (2022.01); *G06V 40/11* (2022.01); *G06V 40/1312* (2022.01); *G06V 40/117* (2022.01)

(58) Field of Classification Search
CPC .......... G06K 9/00275; G06K 9/00281; G06K 9/00362; G06K 9/001; G06K 2009/00932; G06K 9/00382; G06K 9/00033; G06K 9/00885; G06K 2009/00395; G06F 21/32
See application file for complete search history.

(56) References Cited

U.S. PATENT DOCUMENTS

| | | | | |
|---|---|---|---|---|
| 9,595,143 | B1* | 3/2017 | Ashenfelter | G07C 9/257 |
| 2006/0050933 | A1* | 3/2006 | Adam | G06V 40/171 |
| | | | | 382/118 |
| 2011/0102137 | A1* | 5/2011 | Schroter | A61B 5/1072 |
| | | | | 340/5.52 |
| 2014/0003674 | A1* | 1/2014 | Coley | G06V 40/11 |
| | | | | 382/115 |
| 2015/0269452 | A1* | 9/2015 | Vardy | G06V 40/10 |
| | | | | 382/115 |
| 2015/0347833 | A1* | 12/2015 | Robinson | G06K 9/00536 |
| | | | | 348/49 |

(Continued)

FOREIGN PATENT DOCUMENTS

| | | | | |
|---|---|---|---|---|
| WO | WO-2010099356 | A1 * | 9/2010 | G06K 9/00033 |
| WO | WO-2020095739 | A1 * | 5/2020 | G06F 21/32 |

OTHER PUBLICATIONS

Multi-Biometric System Based on Cutting-Edge Equipment for Experimental Contactless Verification—2019 (Year: 2019).*

(Continued)

*Primary Examiner* — Nizar N Sivji

(57) ABSTRACT

Traditionally, biometrics provides identification based on fingerprints, iris, or face to a vendor. The vendor's database can be hacked or a person's traditional biometrics can be stolen or compromised. Because an individual has only FFten fingers and two eyes, if compromised, secure identification becomes very difficult. A new approach for personal identification, leveraging "skin" biometrics, offers protection for individuals, and provides the ability to change their biometric identity by selecting a different patch of skin to use as skin identification. The biometric method and system provides biometric identification based on a small section of a person's skin. Skin biometrics is leveraged for positive identification of individuals. Skin biometrics captures a region of the subject's skin topography, then maps surface landmarks, creating a unique result that the user can provide in various authentication scenarios. The Skin-PIN combines with the virtually limitless possibilities of skin areas on the body of a user.

14 Claims, 15 Drawing Sheets

(56) References Cited

U.S. PATENT DOCUMENTS

| | | | | |
|---|---|---|---|---|
| 2016/0162673 A1* | 6/2016 | Kutliroff | .................. | G06F 18/28 |
| | | | | 382/115 |
| 2016/0283808 A1* | 9/2016 | Oganezov | ............... | G06V 40/10 |
| 2016/0300094 A1* | 10/2016 | Lu | ........................... | G06V 10/54 |
| 2016/0371555 A1* | 12/2016 | Derakhshani | ......... | A61B 5/1102 |
| 2017/0147862 A1* | 5/2017 | Kim | .................. | G06Q 20/40145 |
| 2017/0339417 A1* | 11/2017 | Puri | .................... | G06F 18/2178 |
| 2018/0008188 A1* | 1/2018 | Adiri | ...................... | G06V 10/17 |
| 2018/0165508 A1* | 6/2018 | Othman | .............. | G06V 40/1371 |
| 2019/0122024 A1* | 4/2019 | Schwartz | ............ | G06V 40/1347 |
| 2020/0082062 A1* | 3/2020 | Mequanint | ............. | G06V 40/50 |
| 2020/0104471 A1* | 4/2020 | Yang | ....................... | H04M 1/22 |
| 2020/0302053 A1* | 9/2020 | Arora | ................... | G06V 40/171 |
| 2021/0089635 A1* | 3/2021 | Weeresinghe | ... | G06Q 20/40145 |
| 2021/0176241 A1* | 6/2021 | Franzi | ................... | H04W 12/06 |

OTHER PUBLICATIONS

Multispectral Fingerprint Image Acquisition—2008 (Year: 2008).*
Learning Race from Face: A Survey—2014 (Year: 2014).*

* cited by examiner

SKIN PERSONAL IDENTIFICATION (SKIN-PIN)

BACKGROUND

Field of the Invention

The invention relates to the collection of biometrics for use in providing positive identification of an individual, in order for the individual to obtain authorized access to logical, physical, or other protected access systems. Unlike conventional access systems, Skin-PIN does not utilize fingerprint, iris, face, hand geometry, or other traditional methods of recognition for identification purposes. Skin-PIN captures an image of a user-selected region of the skin, compares the captured image to a previously captured image on file, and authenticates the user for physical, logical or other protected access.

Description of the Related Art

All of today's biometric recognition systems share similar characteristics regarding uniqueness and non-revocability. Once Common biometrics, such as fingerprints, iris, or face of a client is obtained, and a compromise takes place, the compromised biometrics is forever compromised. Current technology exists to take your biometrics from the compromised database and reconstruct a surrogate biometric that will allow biometric access to systems that use your biometrics. From a uniqueness standpoint, a user only has one face, ten fingerprints, and two irises from which to choose. Therefore, an authentication system that accepts iris recognition means there are only two points on the subject's body that need to be targeted by a nefarious third party looking to hack into the subject's account. However, when observing a subject's skin as a biometric, that same third party cannot reasonably predict which area of the skin the subject has been captured for his Skin-PIN identification, thus discouraging and rendering exceedingly difficult, any attempt to hack into the subject's account.

From a revocation standpoint, for example, once a user has submitted his or her ten fingerprints, there is no recourse for changing them. By illustration, if the subject provides fingerprints at Bank A for account access, Bank A stores those fingerprints as a reference file. If the subject closes his account at Bank A and opens an account or accounts at Bank B with the subject's fingerprints, a third party could theoretically hack into Bank A's system to obtain the subject's fingerprints and utilize them to access the subject's account at Bank B.

Conversely, assuming these same Banks A and B utilized the Skin-PIN, once the subject closes his or her account at Bank A, Bank B would have to capture the image of a different area of his skin for his Skin-PIN at Bank B; thus effectively revoking his Skin-PIN originally provided to Bank A.

Thus, the need arises for a biometric capturing system that uses a biometric capture system, which is extraordinarily difficult to hack into; and ran be easily and readily changed.

SUMMARY OF THE INVENTION

A system, method and apparatus of the exemplary embodiment is provided for Skin Personal Identification (Skin-PIN) for positive identification of cooperative individuals seeking access to physical, logical, or informational systems. The average human body has 22 square feet of skin, which essentially affords the user essentially limitless biometric identification "PINs" because the user can capture an image virtually anywhere on his or her body that is reasonably accessible at the time the Skin-PIN would be presented to the system. Adjustments by even a millimeter or a few millimeters from the original image create an entirely new Skin-PIN. Thus, the system leverages the user's skin as a near-infinite source of Skin-PINs should the user ever need to revoke or change a previous PIN and enroll with another Skin-PIN.

Skin-PIN is based on a novel technique and apparatus that captures a region of the subject's skin topography, then maps surface landmarks (both visible and invisible to the naked eye), creating a unique result that the user can provide in various authentication scenarios. The Skin-PIN represents a significant advancement over current state-of-the-art biometric capture which uses biometrics-as-PINs, due to the inherent uniqueness of the skin surface area captured, combined with the virtually limitless possibilities on the exact area captured, creating a biometric that is easily and seamlessly revocable by the subject, thus reducing opportunities for another party to mimic, or fraudulently appropriate the biometric. Whereas traditional, specific biometrics such as face, finger and iris are more easily targeted for appropriation, the Skin PIN restores anonymity to the user through its ease-of-revocation trait.

The Skin-PIN method and apparatus provides the means by which one can positively identify, authenticate and authorize users (subjects). Essentially, in operation of an exemplary embodiment, the subject takes an image of an area of his skin; the system authenticates the image provided, compares it with the referenced files and determines if the individual is authorized access to their account.

A picture of the skin surface (hand, arm, leg, etc.) is taken, and rendered in either a squared or rendered in a circular format. Although other formats can be used, as would be understood by an artisan. Crosshairs can be placed onto freckles and other topographical landmarks, and measurements taken between the various landmarks. The device captures multiple viewpoints and blends them algorithmically. The device creates the unique topographical map through three primary functions: finds the objects, examines each object, and computes the distance between the objects. The device utilizes a high-resolution camera in order to capture non-visible landmarks, such as the topography of the epidermis.

According to an exemplary embodiment, a skin recognition system for identifying an individual, the system includes: a mobile communications device, computer or camera including an imaging device producing an image signal of a portion of person's skin topograph; a software program that extracts said person's skin image from said imaging device; a software program which converts the image of the person's skin to a template for image comparison; a database of individual records containing skin biometric templates; a biometric template match system that compares and computes a percentage of match between said skin image and said skin template from said database.

According to an exemplary embodiment, a method of providing a skin recognition system for identifying an individual through selecting and utilizing a biometric-based skin image comparison, includes the steps of identifying and selecting a small area of a person's skin to be a personal identification point, photographing the small area of a person's skin, converting the small area to a comparison template, comparing the small comparison template to a reference template, determining whether the comparison template matches the reference template and, transmitting a match or no match between the photographed skin area and reference template to an access system.

A method of providing a skin recognition system for identifying an individual by selecting and utilizing a biometric-based skin image comparison; the method comprising the steps of:

selecting an area of a person's skin located near or on a joint;

moving said joint to a configuration producing or removing visible skin olds or skin creases;

photographing said skin image location it the said configuration, producing a unique image;

comparing said unique image to an image in a verification database;

determining whether the unique image matches the said image in the verification database.

According to an exemplary embodiment, an identification method provides a skin recognition system for identifying an individual through using multiple body parts and their relative relationship to each other; the method comprising the steps of selecting two or more body parts; moving the selected body parts into a configuration producing a visible relationship to each other; photographing the configuration to produce a unique image; comparing the unique image to an image in a verification database, and determining whether the unique image matches the image in the verification database.

According to an identification method providing a skin recognition system for identifying an individual through using multiple body parts and their relative relationship to each other; the method comprising the steps of selecting two or more body parts; moving the selected body parts into a configuration producing a visible relationship to each other; photographing the configuration to produce a unique image; comparing the unique image to an image in a verification database, and determining whether the unique image matches the image in the verification database.

LIST OF REFERENCE NUMERALS

Figure 1:
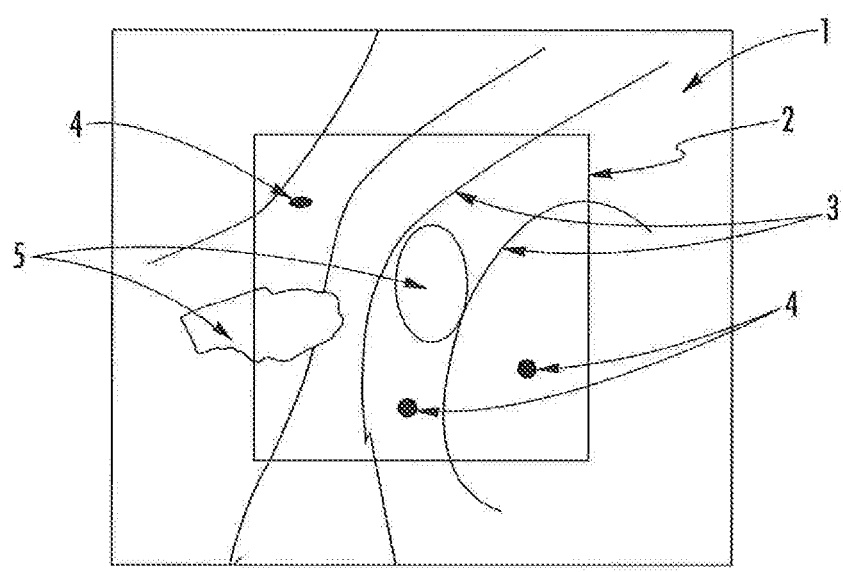
FIG. 1 illustrates an area of skin with various identification marks such as freckles, color spots, creases, etc.

Item 1=skin area.

Item 2=a selected skin identification area of the skin area for examination.

Item 3=identifying lines, creases, cell structures forming lines.

Item 4=identifying mark such as a freckle, mole, scar or tattoo.

Item 5=larger identifying marks with shapes such as color spots, large moles, scars, tattoo, pen or ink mark.

Item 6=measured distances between identifying marks.

Item 7=angles between measured distance vectors.

Item 8=skin identification area behind a knuckle.

Item 9=random skin identification area on the palm.

Item 10=skin creases, lines on a skin identification area on the palm.

Item 11=skin creases or visible veins on a skin identification area on the wrist.

Item 12=skin creases on the base of a skin identification area on the palm.

Item 13=skin identification area at the base of the thumb.

Item 14=skin identification area on the side of the thumb.

Item 15=skin identification area at the base of a palm.

Item 16=wrist.

Item 17=skin identification area on the front of a knuckle.

Item 18=skin identification area on a little finger knuckle.

Item 19=skin identification area of the side of a wrist.

Item 20=inside of an arm.

Item 21=skin identification features inside of a skin identification area.

Item 22=larger skin identification area.

Item 23=smaller skin identification area.

Item 24=skin identification inside of the arm.

Item 25=skin identification areas inside the upper arm.

Item 26=skin identification of finger and/or fingernail.

Item 27=skin identification area of multiple fingers.

Item 27'=spacing between two adjacent fingers.

Item 27"=bent finger.

Item 28=skin identification area of arm joint fold.

Item 29=skin identification area of elbow.

Item 30=upper arm.

Item 31=skin identification area of upper arm.

Item 12=pen mark or manmade mark added to the skin.

Item 33=pen mark or manmade mark in the shape of a number or letter.

Item 34=photographic box as seen in the photographic device.

Item 35=aiming point or cross hairs inside the photographic box.

Item 36=mobile communication device.

Item 37=is an imaging device or computer.

Item 38=is a program for extracting a skin image.

Item 39=is a program for converting a skin image into a template.

item 40=is a skin biometric template database.
Item 41=is a template match system.
Item 42=is an access system.

DETAILED DESCRIPTION OF THE EXEMPLARY PREFERRED EMBODIMENTS OF THE INVENTION

An exemplary embodiment of the present invention is directed to a method and system for using a person's skin as a biometric identification of the individual. This invention does not use traditional biometrics such as fingerprints, iris, face, hand geometry, or voice. Skin-PIN exemplary features include:

(1) Using skin of an individual as a biometric identification technology.

(2) A new way to achieve two-factors of authentication; something you know—the location of the skin to be used, and something you are—the skin patch or configuration taken in the photo.

(3) Allowing the ability to change your biometric personal identification (PIN) such as on a 90-day cycle or when a compromise is suspected or identified. Traditional biometrics involve the limited set of fingerprints or irises.

(4) The ability or add a temporary ink symbol or tattoo to the Skin-PIN.

(5) Traditional comparisons and matching algorithms are significantly different focusing on fingerprint minutia points, or bifurcation points of a fingerprint or iris lines and bends of an iris. The Skin-PIN only requires standard image or photograph comparison algorithms, which are commonly available and are more robust than highly specialized traditional biometrics (6) Selected skin areas, such as the palm of a hand can be configured differently, depending on how wide one opens their hand when taking the Skin-PIN photo.

Referring to FIG. 1, item 1 represents a section of a person's skin area. The skin area used for the biometric are selected from a reasonably accessible area, such as the back of the hand, palm, wrist, finger joints, lower and upper arm, parts of face, or wherever the individual selects. Item 2 represents a selected skin identification area of the skin area of an individual. In operation, item 2 is captured by a camera, such as a cell phone with camera, or any suitable device with a camera. One-to-one comparison algorithms compare the new Skin-PIN image with a previously created reference Skin-PIN, and then calculate a correlation number. In response to the software determining that the correlation number is above or below a threshold number, a match or no-match decision is determined. Items 3, 4 and 5 represent identifying skin features, such as creases, which are compared in order to determine the probability of a match. This user-established identification represents a photo of a person's skin lines, creases, cell structures, visible veins, or other line features visible to the capturing camera. Item 4 represents an identifying mark on the skin, such as a freckle, scar, mole, tattoo, pen or ink mark. Item 5 represents dark or color spots on the skin of an individual that contribute to positive or negative identification.

Figure 2:
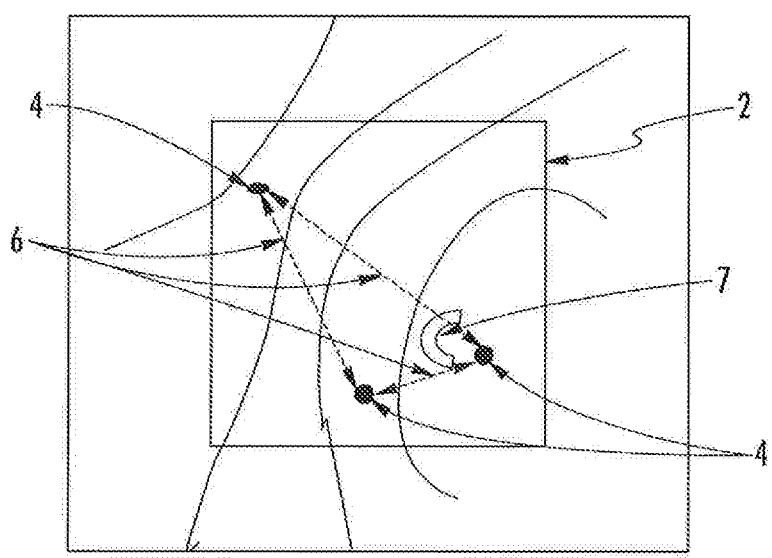
FIG. 2 illustrates electronically identifiable distances and angles between various skin identification marks.

Referring to FIG. 2, this figure graphically presents an example of a matching algorithm that utilizes distances and angles between identification points. Item 4 depicts identifying marks on the skin such as a freckle, scar, mole, tattoo, pen or ink mark, etc. Item 6 depicts graphical vectors and calculated distances between identifying marks on the skin of an individual. Item 7 represents an example of vector angles between graphical vectors. This calculated data is then submitted to a software comparison program, which determines whether a match or no-match has occurred.

Figure 3:
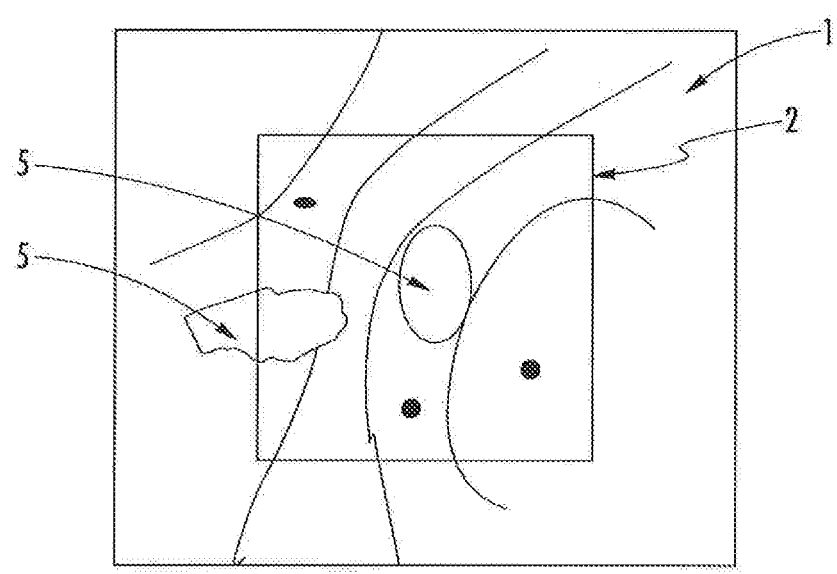
FIG. 3 illustrates irregular shapes for skin color spots.

Referring to FIG. 3, item 5 shows larger irregular shapes of skin marks such as differing color, age spots, liver spots, birthmarks, or other distinct shapes, which can be used for image matching between the captured image and the registered image on file.

Figure 4:
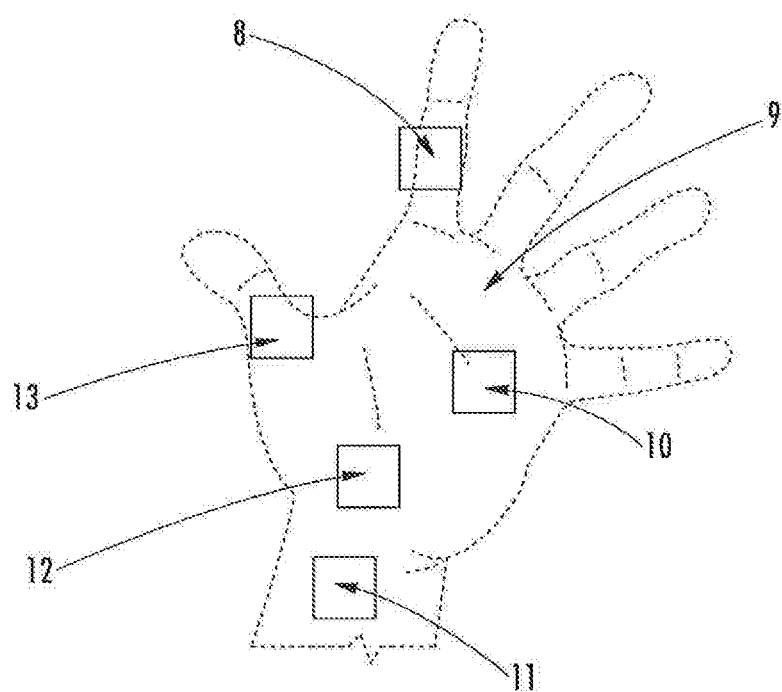
FIG. 4 illustrates the inside of an individual's hand and examples of skin locations where skin photos can be taken.

Referring to FIG. 4, items 8, 10, 11, 12 and 13 represent areas of the hand where there are easily identifiable skin-folds that can be used for identification. Skin fold areas also offer an advantage Wherein the individual can open or close an area, thus changing the skin fold image of the same area.

Figure 5:
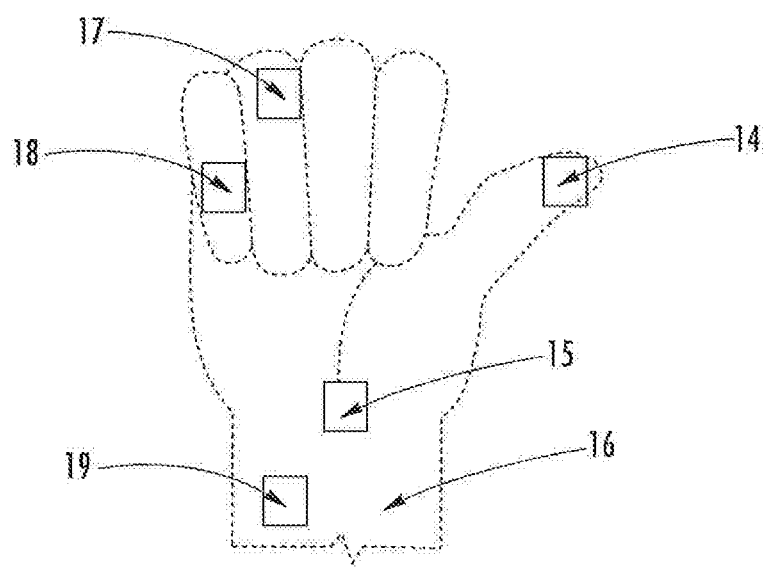
FIG. 5 illustrates four folded fingers of a hand and examples where skin photos can be taken.

Referring to FIG. 5, items 14, 15, 16, 17, 18 and 19 represent areas where skin folds are easily identifiable, and items 14, 15, 15, 17, 18 and 19 are for purposes of identification matching.

Figure 6:
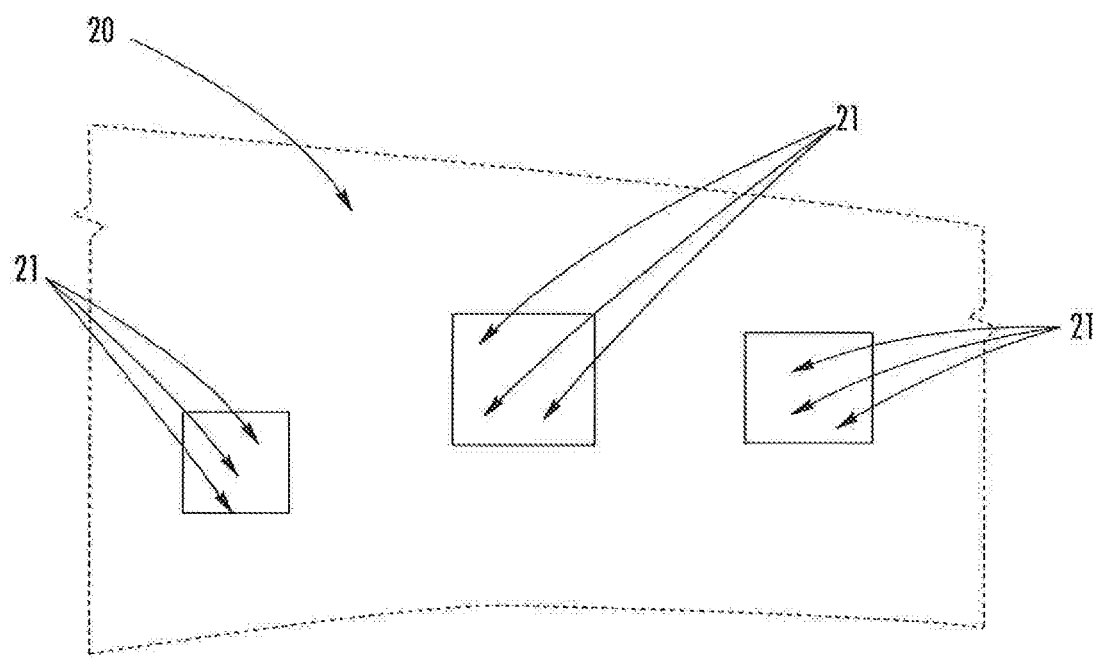
FIG. 6 illustrates a representation of the inside of an arm and examples where skin photos can be taken.

Referring to FIG. 6, in this representation, item 21 represents an area of the arm, 20 of a user, which has identification marks such as freckles, veins, ridges or depressions.

Figure 7:
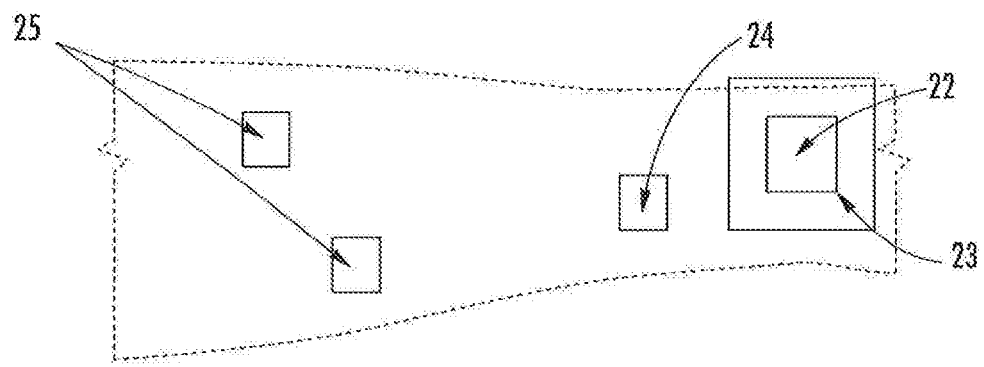
FIG. 7 illustrates a representation of additional areas of an arm and wrist, and examples where skin photos can be taken.

Referring to FIG. 7, items 22, 23, 24 and 25 of the photograph represent additional areas of the arm for selecting Skin-PINs. Item 23 represents a larger area of Skin-PIN while item 22 represents a smaller area of the wrist. The user can vary the site of the skin biometric area for further enhancement of the uniqueness of the Skin-PIN registered template and the identification image.

Figure 8A:
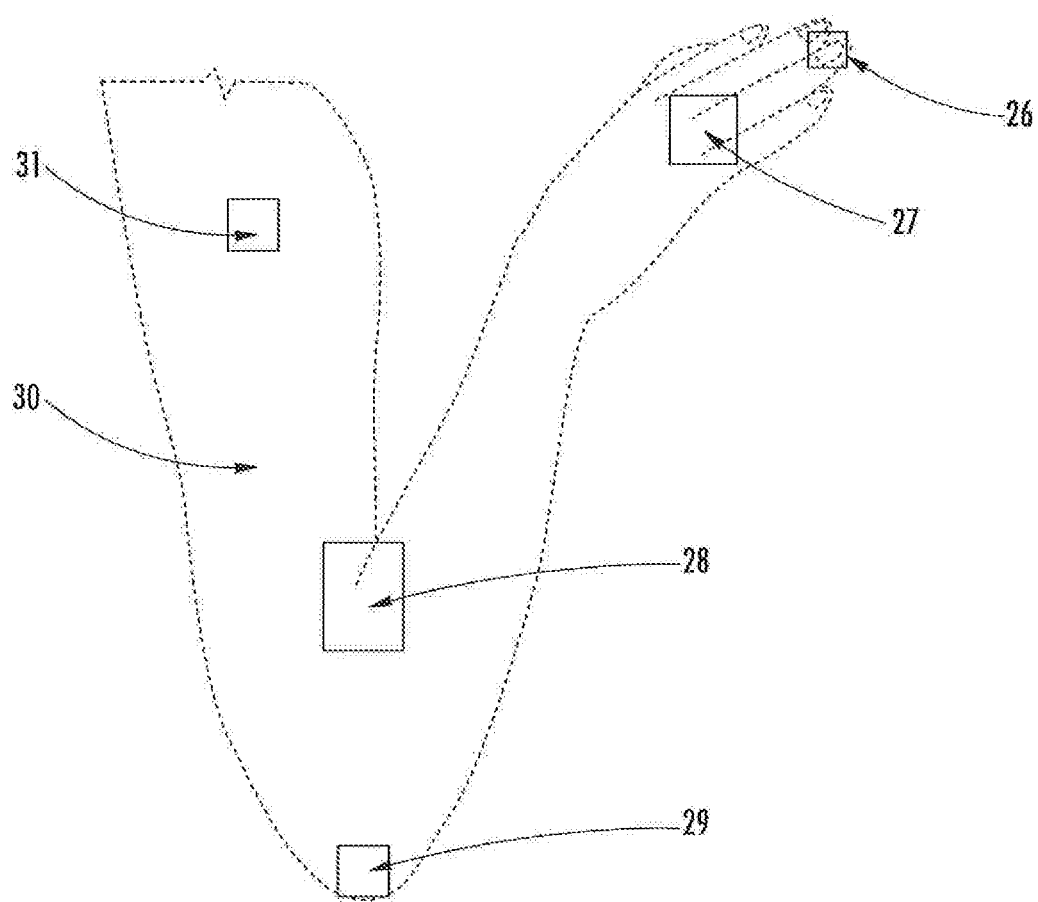
FIG. 8A illustrates a representation of an arm, shoulder, elbow and hand configuration and locations where skin photos can be taken.

Referring to FIG. 8A, this figure illustrates an arm, item 30, and represents numerous areas of the arm that may be used for selecting Skin-PINs. Item 26 represents the use of the fingernail as a Skin-PIN. Since the basic matching algorithm can be the comparison of two images, a photo of a fingernail can be used. Similarly, a photograph of two fingers and the related space between them, as illustrated in item 27, can be used for image matching.

Figure 8B:
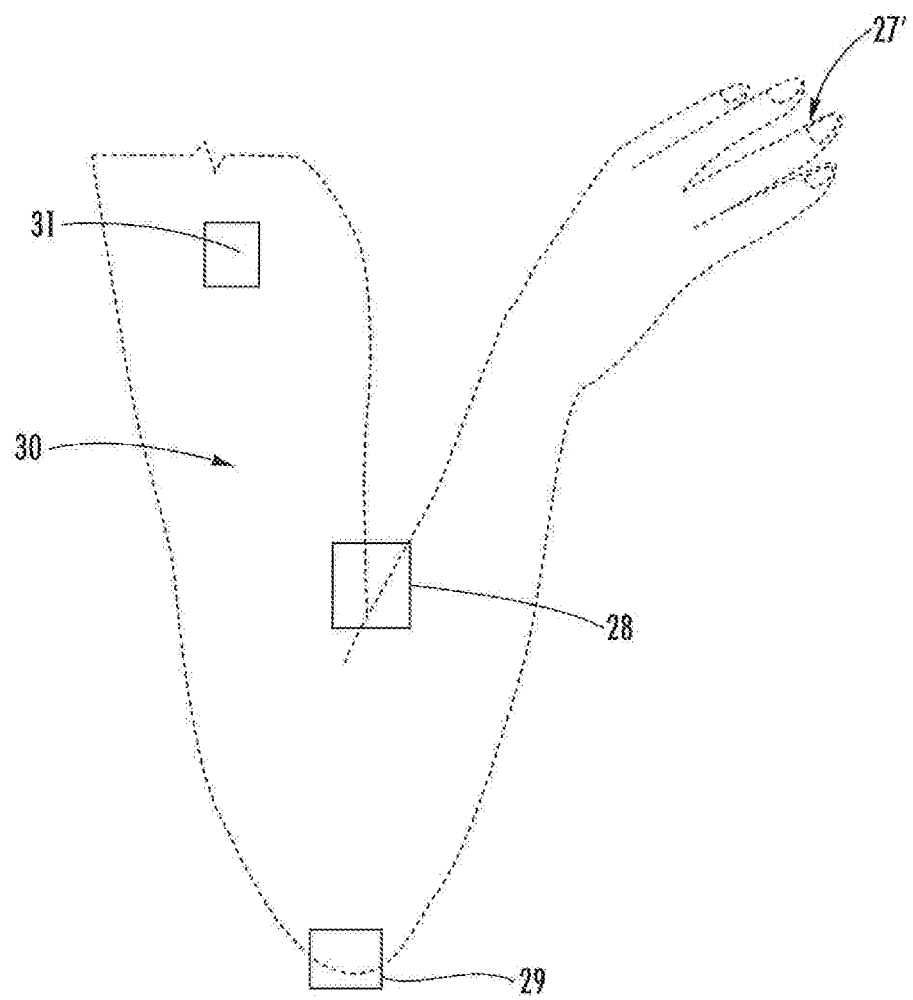
FIG. 8B illustrates a portion of an individual's body, as shown in FIG. 8A, but with the hand having two fingers spaced apart.

Referring to FIG. 8B, this figure is similar to FIG. 8A but has two of the individual's fingers spaced apart. In an exemplary embodiment, this fingers and spacing can be a biometric Skin-PIN.

Figure 8C:
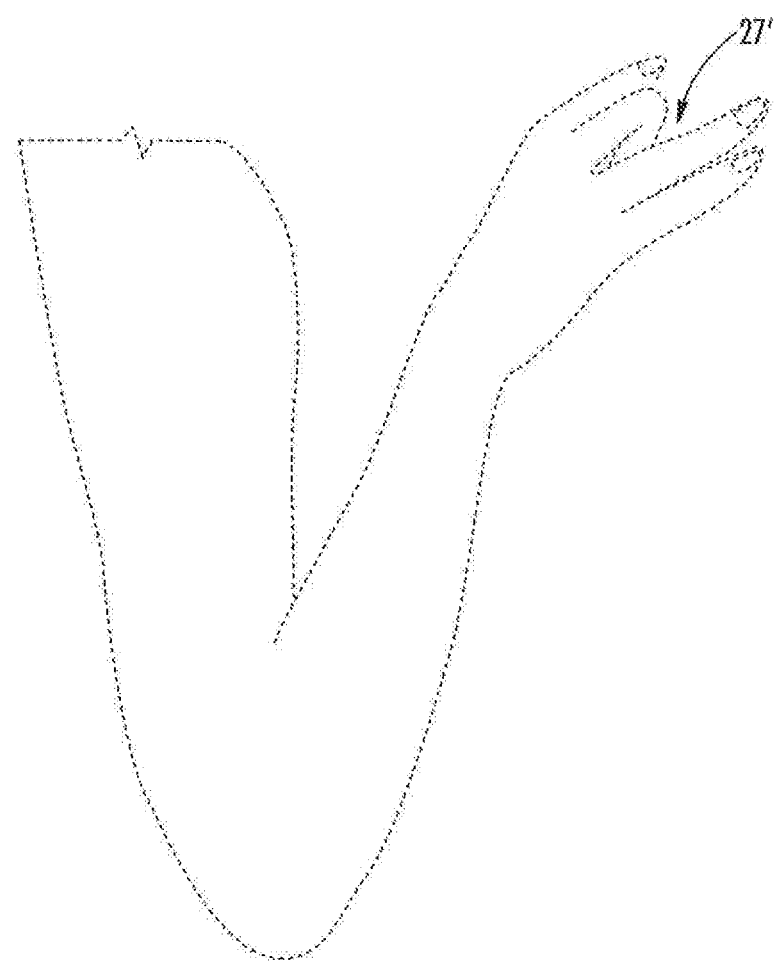
FIG. 8C illustrates a portion of an individual's body, as shown in FIG. 8B, but with two of the fingers spaced apart and one of the fingers is bent.

Referring to FIG. 8C this figure is similar to FIG. 8B but has two of the individual's fingers spaced apart and one of the fingers is bent. In another exemplary embodiment, this finger spacing and/or bent finger or fingers can be a biometric Skin-PIN.

Figure 9:
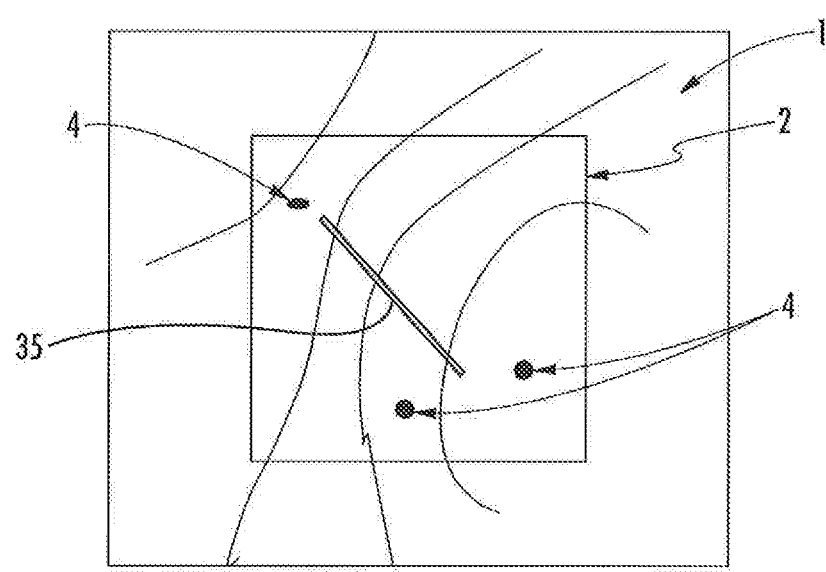
FIG. 9 illustrates the addition of a pen mark or other manmade mark line or configuration on the skin of an individual, which is added to the skin identification area.

Referring to FIG. 9, item 32 represents adding a simple marking on the skin, such as a line, that will enhance the Skin-PIN uniqueness for image matching.

Figure 10:
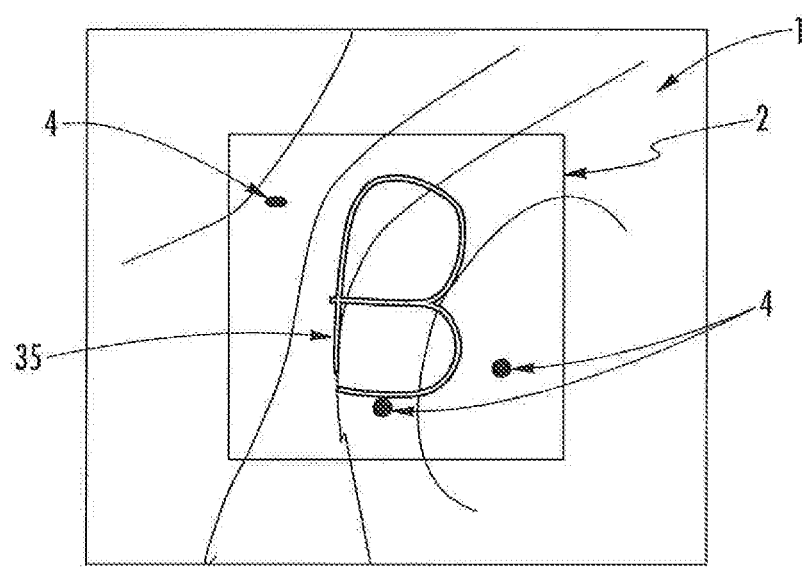
FIG. 10 illustrates the addition of a pen mark or other manmade mark in the shape of a letter or number, which is added to the skin identification area of an individual.

Referring to FIG. 10, item 13 represents adding a marking to the skin, such as a letter written on the Skin-PIN area a letter, a tattoo, or other additional feature, in order to achieve uniqueness beyond what the basic skin offers. This may be helpful for those with very few skin identification marks.

Figure 11:
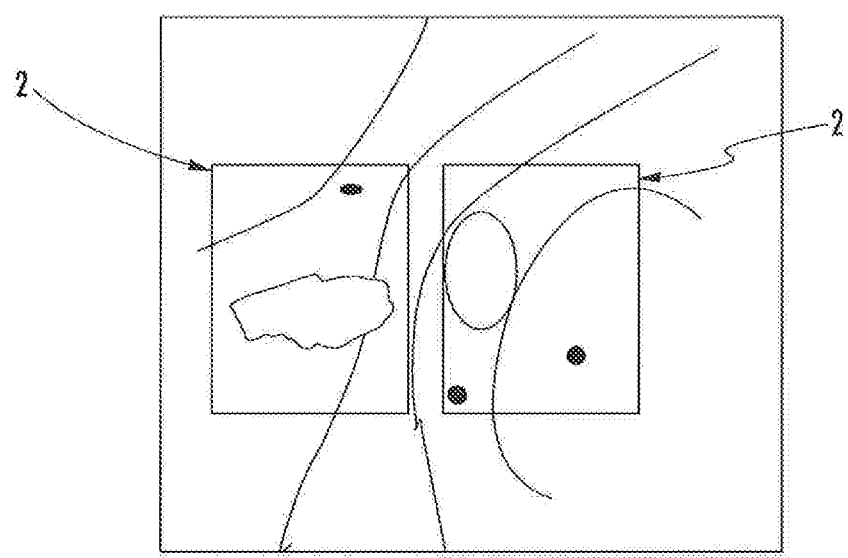
FIG. 11 illustrates the use of two or more skin identification areas used in conjunction with each other, for a more complex personal identification of an individual.

Referring to FIG. 11, item 2 represents an approach to use two or more Skin-PINs to increase the security level of the Skin-PIN. The Skin-PIN system could have the option of using two or more Skin-PINs for authentication and verification of the biometric identity.

Figure 12:
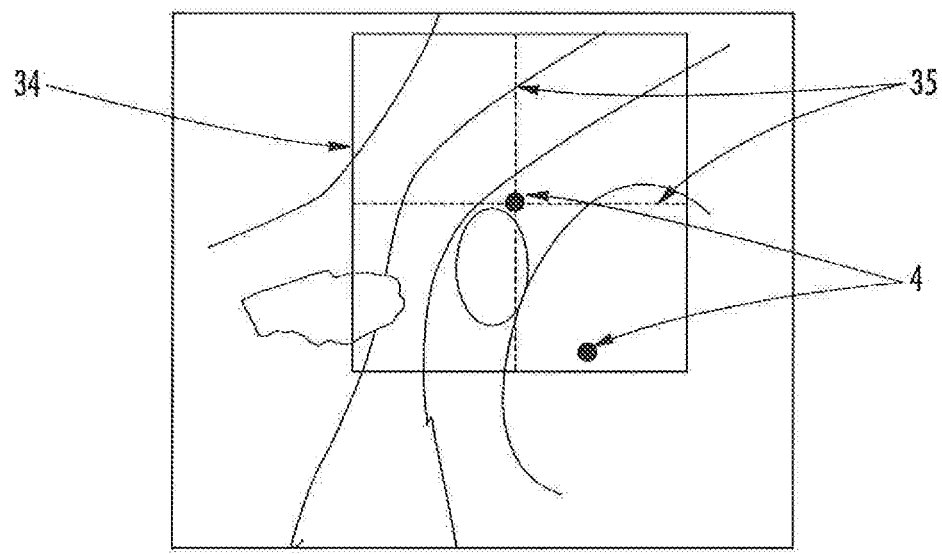
FIG. 12 illustrates the cross hairs of the photographic device centering on a skin identification area of an individual.

Referring to FIG. 12, item 34 represents a box, circle, or other shape that is presented in the photographic collection device that shows the individual the area to be photographed. Item 4 represents a skin identification point that the user will focus on for the repeatable biometrics Skin-PIN photo. Item 35 represents an aiming point consisting of cross hairs, a dot, aiming lines, or a similar indication to assist the user in centering the photograph on the same Skin identification point.

Alternative embodiment: Three factors of identification, The Skin-PIN may be used to provide three factors of authentication for identification purposes. Three factors of, are (1) something you have; i.e., skin identification; (2) something you know, i.e., the image collection device, such as a cell phone or computer, can be used to show something you know. The number called or computer-server Internet connection can ID the phone or computer as being the one registered in an authorized database; and (3) something you are. Something you are can refer to gender, age, height, etc.

Alternative embodiment: Four factors of identification. The Skin-PIN with the three factors discussed above can add another factor of identification called geo-location. When using a mobile device or capable computer, the geo-location of the mobile device can also be provided, thus increasing the confidence level that the contact is being made from an authorized location.

Alternative embodiment: Skin-PIN and body part configuration identification. The Skin-PIN also lends itself to use body part configurations in addition to skin identification. An example of this is selecting the Skin-PIN area consisting of two fingers and the angle or space between them. This is illustrated in FIG. 8B. The comparison image will look at the skin on the top of the fingers for marks, folds etc. and will look at the special configuration on how the fingers are separated and bent. An exemplary embodiment can include separated and one or more bent fingers, as illustrated in FIG. 8C.

Figure 13:
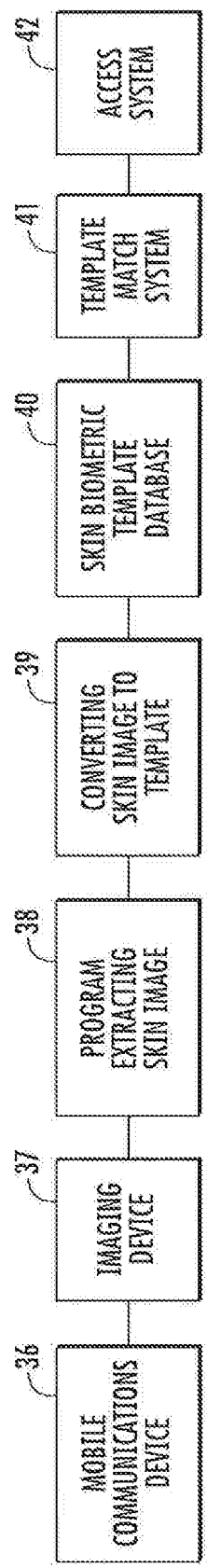
FIG. 13 is a flow chart of a system according to an exemplary embodiment.

FIG. 13 illustrates a representative flowchart of a system for carrying out the claimed invention, As illustrated in FIG. 13, a mobile communication device 36 is provided. This may be a computer or mobile phone, etc. Item 37 represents an imaging device of the mobile communications device or a separate camera. Item 38 refers to a software program for extracting a skin image from imaging device and may combine separate images into a single composite image. Item 39 refers to a software program for converting the extracted skin image into a template. Item 40 represents a skin image template database. Item 41 is a template matching system. The matching system can add the phone number of the mobile communications device or computer-server Internet ID to the skin image. Moreover, the template match system can also add the further information about the individual as well geo-location information, Alternatively, these additional criteria, for enhanced security, can be added at the access system 42.

Although different embodiments of the Skin-PIN Personal Identification System have been described, it should be apparent to those skilled in the art that many more modifications besides those described therein are Possible, without departing from the inventive concepts herein. The inventive subject matter, therefore, is not to be restricted except in the spirit of the appended claims.

What is claimed is:

1. A biometric identification system allowing user to virtually capture number of skin areas for enhanced security comprising:
    a mobile communication device including camera and/or imaging device;
    at least one memory having a database that stores and execute the instruction and a processor;
    cause the processor to perform operations comprising:
    produce an image signal of a portion of person's skin topograph;
    virtually capture number of skin areas for biometric authentication based on the image signal;
    extract said person's skin image from at least one or more places on a body of the person's skin area captured virtually;
    convert image of the person's skin into an image template;
    extract individual skin image record from the database stored in the memory;
    compare the image template with the extracted individual skin image record and verify if the image template matches with the extracted individual skin image record;
    compute percentage of matching using biometric image for authentication;
    perform additional factor for identification for enhanced security;
    if the image template does not match with the extracted individual skin image record;
    and
    transmitting a match or no match between the individual skin image record and the template to an access systems or information systems.

2. The biometric identification system according to claim 1, wherein the additional factor for identification is a phone number or an identification number.

3. The biometric identification system according to claim 1, wherein the additional factor for identification is geo-location data.

4. The biometric identification system according to claim 1, wherein the additional factor for identification is using multiple skin image area.

5. The biometric identification system according to claim 1, wherein the skin area is located near or on a joint.

6. The biometric identification system according to claim 1, wherein the skin area is a small area.

7. The biometric identification method according to claim 1, wherein the biometric identification system is a Skin-PIN system.

8. A biometric identification method allowing user to virtually capture number of skin areas for enhanced security comprising:
    a mobile communication device including camera and/or imaging device;
    at least one memory having a database that stores and execute the instruction and a processor;
    cause the processor to perform operations comprising:
    produce an image signal of a portion of person's skin topograph;
    virtually capture number of skin areas for biometric authentication based on the image signal;
    extract said person's skin image from at least one or more places on a body of the person's skin area captured virtually;
    convert image of the person's skin into an image template;
    extract individual skin image record from the database stored in the memory;
    compare the image template with the extracted individual skin image record and verify if the image template matches with the extracted individual skin image record;
    compute percentage of matching using biometric image for authentication;
    perform additional factor for identification for enhanced security;
    if the image template does not match with the extracted individual skin image record;
    and
    transmitting a match or no match between the individual skin image record and the template to an access systems or information systems.

9. The biometric identification method according to claim 7, wherein the additional factor for identification is a phone number or an identification number.

10. The biometric identification method according to claim 7, wherein the additional factor for identification is geo-location data.

11. The biometric identification method according to claim 7, wherein the additional factor for identification is using multiple skin image area.

12. The biometric identification method according to claim 7, wherein the skin area is located near or on a joint.

13. The biometric identification method according to claim 7, wherein the skin area is a small area.

14. The biometric identification method according to claim 7, wherein the biometric identification system is a Skin-PIN system.

* * * * *